(12) United States Patent
Li et al.

(10) Patent No.: US 10,459,573 B2
(45) Date of Patent: Oct. 29, 2019

(54) IN-CELL TOUCH PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Changfeng Li, Beijing (CN); Xue Dong, Beijing (CN); Haisheng Wang, Beijing (CN); Yingming Liu, Beijing (CN); Shengji Yang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 425 days.

(21) Appl. No.: 14/914,592

(22) PCT Filed: Aug. 21, 2015

(86) PCT No.: PCT/CN2015/087769
§ 371 (c)(1),
(2) Date: Feb. 25, 2016

(87) PCT Pub. No.: WO2016/112693
PCT Pub. Date: Jul. 21, 2016

(65) Prior Publication Data
US 2016/0357337 A1 Dec. 8, 2016

(30) Foreign Application Priority Data

Jan. 16, 2015 (CN) .......................... 2015 1 0024268

(51) Int. Cl.
*G06F 3/041* (2006.01)
*G06F 3/044* (2006.01)
(Continued)

(52) U.S. Cl.
CPC ...... *G06F 3/04184* (2019.05); *G02F 1/13338* (2013.01); *G02F 1/134363* (2013.01);
(Continued)

(58) Field of Classification Search
CPC .......... G06F 3/041–04186; G06F 3/044–0448; G06F 2203/04103; G06F 2203/04111;
(Continued)

(56) References Cited

U.S. PATENT DOCUMENTS

2011/0199324 A1* 8/2011 Wang .................... G06F 3/0412
345/173
2013/0335355 A1* 12/2013 Ding ..................... G06F 3/0416
345/173
(Continued)

FOREIGN PATENT DOCUMENTS

CN 201622554 U 11/2010
CN 101943975 A 1/2011
(Continued)

OTHER PUBLICATIONS

Jan. 22, 2017—(CN) First Office Action Appn 201510024268.3 with English Tran.
(Continued)

*Primary Examiner* — David Tung
(74) *Attorney, Agent, or Firm* — Banner & Witcoff, Ltd.

(57) ABSTRACT

An in-cell touch panel and a display device are provided, and the in-cell touch panel includes: an upper substrate and a lower substrate which are opposite to each other; a plurality of separate self-capacitive electrodes arranged in an array and in a same layer; and a plurality of conductive wires respectively connected with the self-capacitive electrodes. Both the conductive wires and the self-capacitive electrodes are arranged at a side, facing the lower substrate, of the upper substrate, or at a side, facing the upper substrate, of the
(Continued)

lower substrate; and the self-capacitive electrodes each are provided with a plurality of hollowed-out regions. The in-cell touch panel can improve the touch control sensitivity of the touch panel while ensuring a narrow frame design.

12 Claims, 13 Drawing Sheets

(51) Int. Cl.
  *G02F 1/1343* (2006.01)
  *G02F 1/1333* (2006.01)
(52) U.S. Cl.
  CPC ............ *G06F 3/044* (2013.01); *G06F 3/0412* (2013.01); *G06F 3/0416* (2013.01); *G06F 3/0418* (2013.01); *G06F 3/0443* (2019.05); *G06F 3/0446* (2019.05); *G06F 3/0448* (2019.05); *G06F 3/04166* (2019.05); *G02F 2001/134372* (2013.01); *G02F 2201/121* (2013.01); *G02F 2201/123* (2013.01); *G06F 2203/04103* (2013.01); *G06F 2203/04111* (2013.01)
(58) Field of Classification Search
  CPC ........... G02F 1/13338; G02F 1/134363; G02F 2201/121; G02F 2201/123; G02F 2001/134372
  See application file for complete search history.

(56) References Cited

U.S. PATENT DOCUMENTS

| | | | | |
|---|---|---|---|---|
| 2015/0185902 | A1* | 7/2015 | Liu | ............... G06F 3/044 345/174 |
| 2017/0090644 | A1* | 3/2017 | Yao | ............... G06F 3/0416 |

FOREIGN PATENT DOCUMENTS

| | | |
|---|---|---|
| CN | 102662544 A | 9/2012 |
| CN | 102955637 A | 3/2013 |
| CN | 103293785 A | 9/2013 |
| CN | 104020893 A | 9/2014 |
| CN | 104020906 A | 9/2014 |
| CN | 104020911 A | 9/2014 |
| CN | 104536629 A | 4/2015 |
| WO | 2014012499 A1 | 1/2014 |

OTHER PUBLICATIONS

Jun. 14, 2017—(CN) Second Office Action Appn 201510024268.3 with English Tran.

Nov. 19, 2015—(WO)—International Search Report and Written Opinion Appn PCT/CN2015/087769 with English Tran.

* cited by examiner

IN-CELL TOUCH PANEL AND DISPLAY DEVICE

The application is a U.S. National Phase Entry of International Application No. PCT/CN2015/087769 filed on Aug. 21, 2015, designating the United States of America and claiming priority to Chinese Patent Application No. 201510024268.3, filed on Jan. 16, 2015. The present application claims priority to and the benefit of the above-identified applications and the above-identified applications are incorporated by reference herein in their entirety.

TECHNICAL FIELD

At least one embodiment of the present disclosure relates to an in-cell touch panel and a display device.

BACKGROUND

With the rapid development of display technologies, touch panels (touch screen panels) have already been spread all over people's lives. At present, touch panels can be classified into add-on mode touch panels, on-cell touch panels and in-cell touch panels according to formed structures; and in-cell touch panels can be further classified into mutual-capacitive touch panels and self-capacitive touch panels. Due to higher touch sensing accuracy and signal-to-ratio rate, the self-capacitive touch panels are favored by main panel manufacturers.

At present, a self-capacitive touch panel adopts a self-capacitive theory to detect a touch position of a finger and the principle is: providing a plurality of self-capacitive electrodes which are arranged in a same layer and insulated from each other in the touch panel; when a human body does not touch a screen, the capacitance applied to each self-capacitive electrode is at a fixed value; and when the human body touches the screen, the capacitance applied to the self-capacitive electrode to which a touch position corresponds is at the sum of the fixed value plus capacitance of the human body, and a touch control detection chip can determine the touch position by detecting the capacitance variation of each self-capacitive electrode in a touch control time period.

SUMMARY

At least one embodiment of the present disclosure provides an in-cell touch panel and a display device, to improve the touch control sensitivity while ensuring a narrow frame.

At least one embodiment of the present disclosure provides an in-cell touch panel, which includes an upper substrate and a lower substrate which are opposite to each other, a plurality of separate self-capacitive electrodes which are arranged in an array and in a same layer, and a plurality of conductive wires which are connected with the self-capacitive electrodes respectively; both the conductive wires and the self-capacitive electrodes are arranged at a side, facing the lower substrate, of the upper substrate or a side, facing the upper substrate, of the lower substrate; and each of the self-capacitive electrodes is provided with a plurality of hollowed-out regions.

At least one embodiment of the present disclosure further provides a display device which includes the above-mentioned in-cell touch panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, quantity or importance, but distinguish various components. Also, the terms such as "a," "an," etc., are not intended to limit the quantity, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left"

and the like are only used to indicate relative position relationship, and when the position of the object which is described is changed, the relative position relationship may be changed accordingly.

The thicknesses and shapes of all the thin films in the accompanying drawings do not reflect the real scale, the objective of which is merely to schematically describe the embodiments of the present disclosure.

Figure 1:
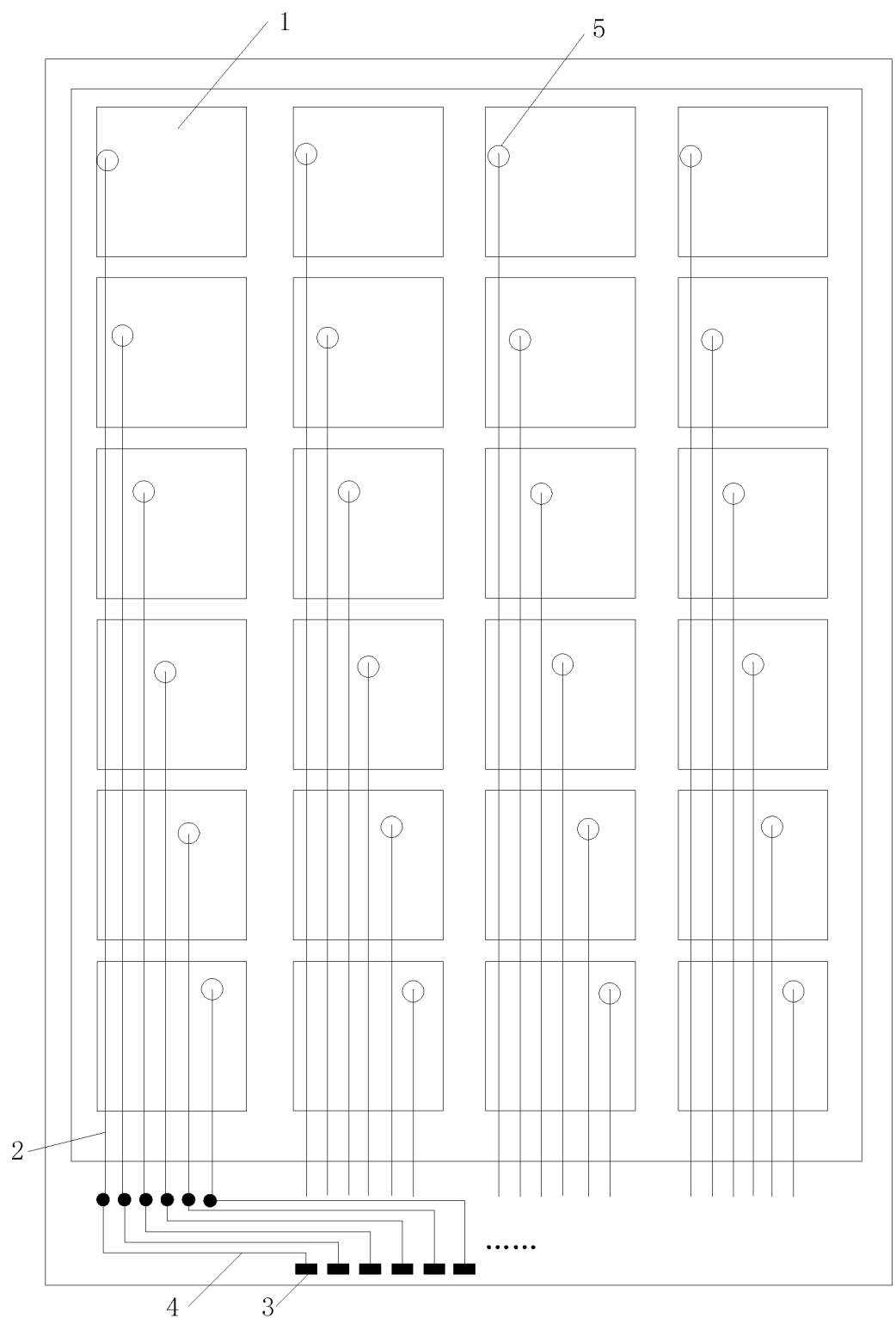
FIG. 1 is a schematic structural view illustrating an in-cell touch panel.

In an in-cell touch panel, in order to connect self-capacitive electrodes to a touch control detection chip, conductive wires respectively corresponding to the self-capacitive electrodes are generally provided. For example, patterns of the conductive wires and self-capacitive electrodes can be arranged in a same layer, or the pattern of the conductive wires and the pattern of the self-capacitive electrodes can be arranged in different layers. Although arranging the conductive wires and the self-capacitive electrodes in the same layer can avoid addition of a new patterning process, the arrangement that the conductive wires and the self-capacitive electrodes are arranged in the same layer can produces a touch blind region, in which all the conductive wires respectively connected with the plurality of the self-capacitive electrodes pass through the touch blind region, and thus signals within the touch blind region are relatively disordered, namely, the touch performance within the region cannot be guaranteed. Based on the above considerations, in a specific implementation, as illustrated in FIG. 1, each self-capacitive electrode is generally connected with the touch control detection chip through a single leading wire, each leading wire, for example, includes: a conductive wire 2 which is arranged in a layer different from the layer where the self-capacitive electrode 1 is located and connects the self-capacitive electrode 1 to a frame of the touch panel, and a peripheral leading wire 4 which is arranged at an edge and configured to connect the self-capacitive electrode 1 to the connection terminal 3 of the touch control detection chip; and the self-capacitive electrode 1 and the corresponding conductive wire 2 are electrically connected with each other through a via hole 5.

In research, the inventors of the present application noted that, according to the self-capacitive theory, in a self-capacitive touch panel, the smaller the area of each self-capacitive electrode is, the smaller the capacitance value applied to the self-capacitive electrode, and thus when a human body touches a screen, the variation of the capacitance applied to the self-capacitive electrode, to which the touch position corresponds, is larger, namely the touch control is more sensitive. However, in the self-capacitive touch panel illustrated in FIG. 1, if only the areas of the self-capacitive electrodes are reduced without changing the quantity of the self-capacitive electrodes, gaps between the self-capacitive electrodes can be increased, and this causes the increase of the touch blind region; and if the areas of the self-capacitive electrodes are reduced and the quantity of the self-capacitive electrodes is increased, the quantity of the conductive wires respectively connected with the self-capacitive electrodes are increased correspondingly, and this leads to a large quantity of the peripheral leading wires which are arranged at an edge and connected with the conductive wires in a one-to-one manner, which is unfavorable to a narrow frame design.

Figure 2A:
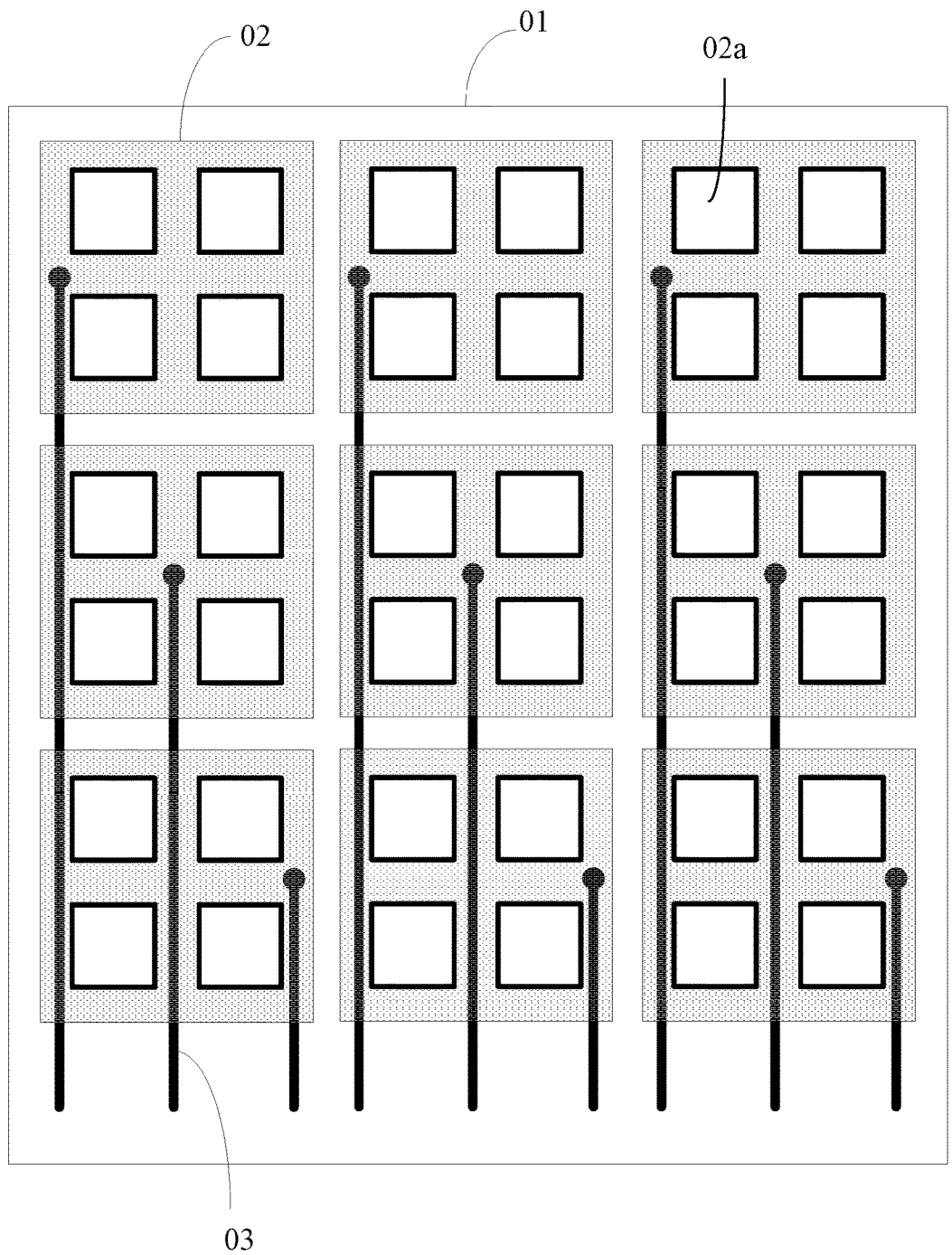
FIG. 2*a* is a first schematic structural view illustrating an in-cell touch panel provided by an embodiment of the present disclosure.
Figure 2B:
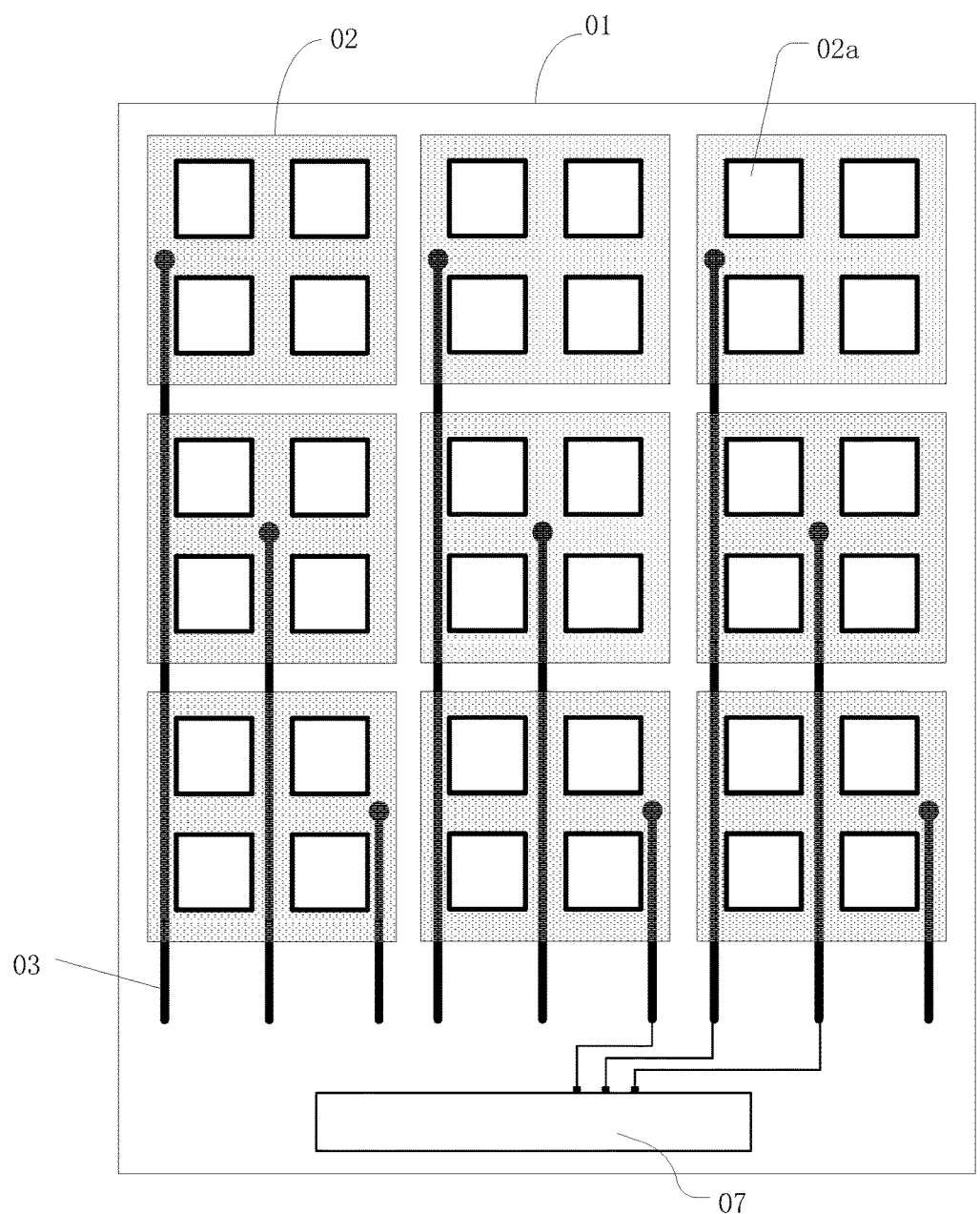
FIG. 2*b* is a second schematic structural view illustrating an in-cell touch panel provided by an embodiment of the present disclosure.
Figure 2C:
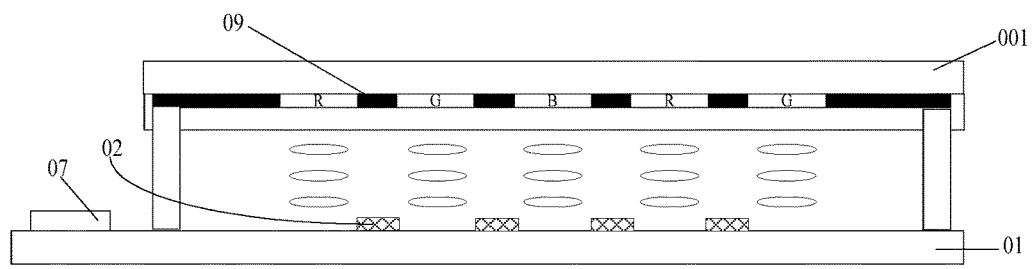
FIG. 2*c* is a third schematic structural view illustrating an in-cell touch panel provided by an embodiment of the present disclosure.

At least one embodiment of the present disclosure provides an in-cell touch panel, as illustrated in FIG. 2a to FIG. 2c, the in-cell touch panel includes an upper substrate 001 and a lower substrate 01 which are opposite to each other, a plurality of separate self-capacitive electrodes 02 which are arranged in an array and in a same layer, and a plurality of conductive wires 03 which are respectively connected with the self-capacitive electrodes 02; both the conductive wires 03 and the self-capacitive electrodes 02 are arranged at a side, facing the lower substrate 01, of the upper substrate, or at a side, facing the upper substrate, of the lower substrate 01; and each self-capacitive electrode 02 is provided with a plurality of hollowed-out regions 02a.

FIG. 2c illustrates only by taking the example that the self-capacitive electrodes are arranged at a side, facing the upper substrate 001, of the lower substrate 01, and the in-cell touch panel is a liquid crystal screen. Embodiments of the present disclosure include the above example but not limited thereto.

For example, the in-cell touch panel can further include: a touch control detection chip 07 which is configured to determine a touch position in a touch control time period by detecting the capacitance variation of each self-capacitive electrode, as illustrated in FIG. 2b and FIG. 2c; and in this situation, the conductive wires 03 respectively connect the self-capacitive electrodes 02 to the touch control detection chip 07.

In the above-mentioned in-cell touch panel provided by an embodiment of the present disclosure, due to that each self-capacitive electrode is provided with the plurality of the hollowed-out regions, the area of each self-capacitive electrode can be reduced, and thus the inherent capacitance of each self-capacitive electrode can be reduced; on the assumption that the capacitance of a finger does not change in touch, the capacitance applied to the self-capacitive electrode, namely the fixed value plus the capacitance of the finger, become relatively smaller, and thus the RC delay of a feedback signal of the self-capacitive electrode can be reduced; and, the capacitance variation between capacitances of the self-capacitive electrode before and after the touch is relatively increased with respect to the inherent capacitance, thus the variation of the feedback signal caused by the finger is accordingly increased, and thus the touch control sensitivity is improved. Besides, the area of each self-capacitive electrode is reduced by providing hollowed-out regions within the self-capacitive electrode, therefore, not only the touch blind region between adjacent self-capacitive electrodes is not increased, but also the quantity of the self-capacitive electrodes is not increased, and compared with the situation as illustrated in FIG. 1, the touch control sensitivity of the touch panel can be improved while guaranteeing a narrow frame design.

The minimum width of a touch blind region that a stylus cannot recognize is generally 1 mm, therefore, for example, in order to avoid generating a touch blind region at the hollowed-out regions of the self-capacitive electrode, in practice, in the above-mentioned in-cell touch panel provided by the embodiment of the present disclosure, the maximum inside diameter of each hollowed-out region may be 1 mm.

In at least one embodiment, the conductive wires and the self-capacitive electrodes can be arranged in a same layer, or can also be arranged in different layers, and limitations are not imposed thereto. For example, in order to further reduce the touch blind region, the conductive wires can be arranged in a layer different from the layer where the self-capacitive electrodes are arranged.

For example, in practice, the above-mentioned in-cell touch panel provided by embodiments of the present disclosure not only can be applied in a twisted nematic (TN) type liquid crystal display, but also can be used in an advanced dimension switch (ADS) type liquid crystal display, a high-advanced dimension switch (HADS) type liquid crystal display and an in-plane switch (IPS) type liquid crystal display.

For example, in a situation where the above-mentioned in-cell touch panel provided by an embodiment of the present disclosure is used in, for example, an ADS type liquid crystal display, each common electrode having a plate-like structure is located below a slit-shaped pixel electrode, namely the common electrode is arranged between the lower substrate and the pixel electrode, and a passivation layer is further arranged between the common electrode and the pixel electrode. In a situation where the in-cell touch panel is used in an HADS type liquid crystal display, each slit-shaped common electrode is arranged on a pixel electrode having a plate-like structure, namely the pixel electrode is located between the lower substrate and the common electrode, and a passivation layer is further arranged between the pixel electrode and the common electrode.

Figure 3:
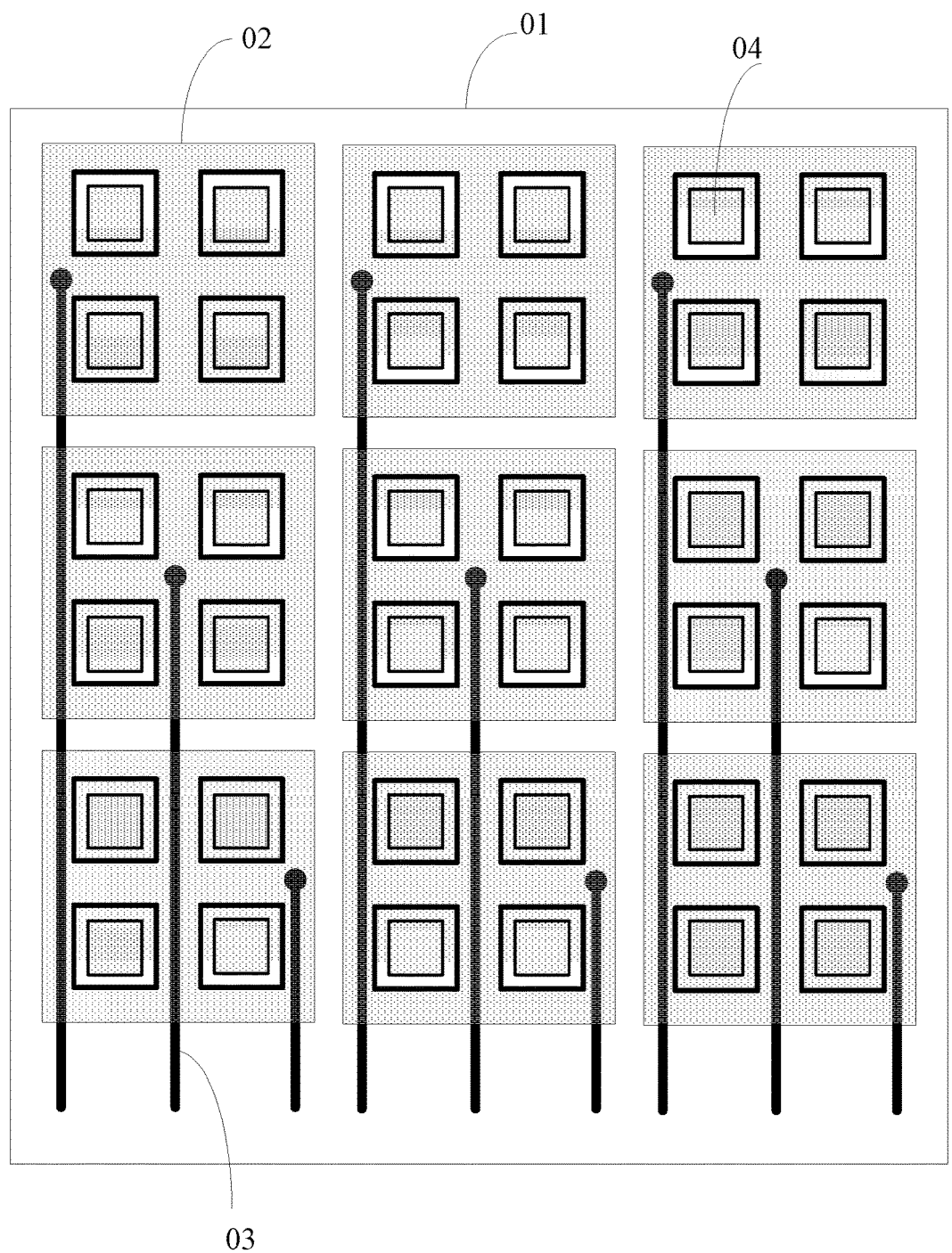
FIG. 3 is a fourth schematic structural view illustrating an in-cell touch panel provided by an embodiment of the present disclosure.

For example, in a situation where the in-cell touch panel provided by an embodiment of the present disclosure is applied in an ADS type liquid crystal display, in order to simplify the manufacturing process and reduce the manufacturing cost, the mode that the common electrode layer on the lower substrate is reused as the self-capacitive electrodes can be adopted, as illustrated in FIG. 3, the self-capacitive electrodes 02 are arranged at a side, facing the upper substrate, of the lower substrate 01; and in this situation, the in-cell touch panel can further include common electrodes 04 which are arranged in the layer where the self-capacitive electrodes 02 are located, and respectively arranged within the hollowed-out regions of each self-capacitive electrode 02, and the common electrodes 04 are insulated from the self-capacitive electrodes 02.

For example, in the situation where the common electrode layer is reused as the self-capacitive electrodes, the touch control detection chip can further be configured to apply a common electrode signal to each common electrode in a display time period.

In this way, in the situation where the structure of the common electrode layer is changed and divided into the self-capacitive electrodes to realize a touch control function, on the basis of a general manufacturing process for an array substrate, there is no need to adding an extra process, thus the production cost can be saved and the production efficiency can be increased.

Generally, the resolution of a touch panel is generally on the order of millimeters, and thus, in one embodiment, the density and occupied areas of the self-capacitive electrodes can be selected according to the required touch resolution so as to ensure the required touch resolution. In general, each self-capacitive electrode is designed to be a square electrode of about 5 mm×5 mm. The resolution of a display is usually on the order of microns, and therefore, one self-capacitive electrode can generally correspond to a plurality of pixels in the display.

Because the above-mentioned touch panel provided by an embodiment of the present disclosure adopts the manner that the common electrode layer is reused as the self-capacitive electrodes, in order to reduce the mutual interference between a display signal and a touch signal, in practice, for example, the manner that the driving in the touch control period and the driving in the display period are performed separately can be used. And, for example, in practice, a display driving chip and a touch control detection chip can also be integrated into one chip, to further reduce the production cost.

In the above-mentioned in-cell touch panel provided by an embodiment of the present disclosure, in a situation where the driving mode of the in-cell touch panel is a time-division driving mode, for example, the touch control detection chip can further be configured to apply a common electrode signal to each common electrode in the touch control time period, and to apply a common electrode signal to each self-capacitive electrode in the display time period.

Figure 4A:
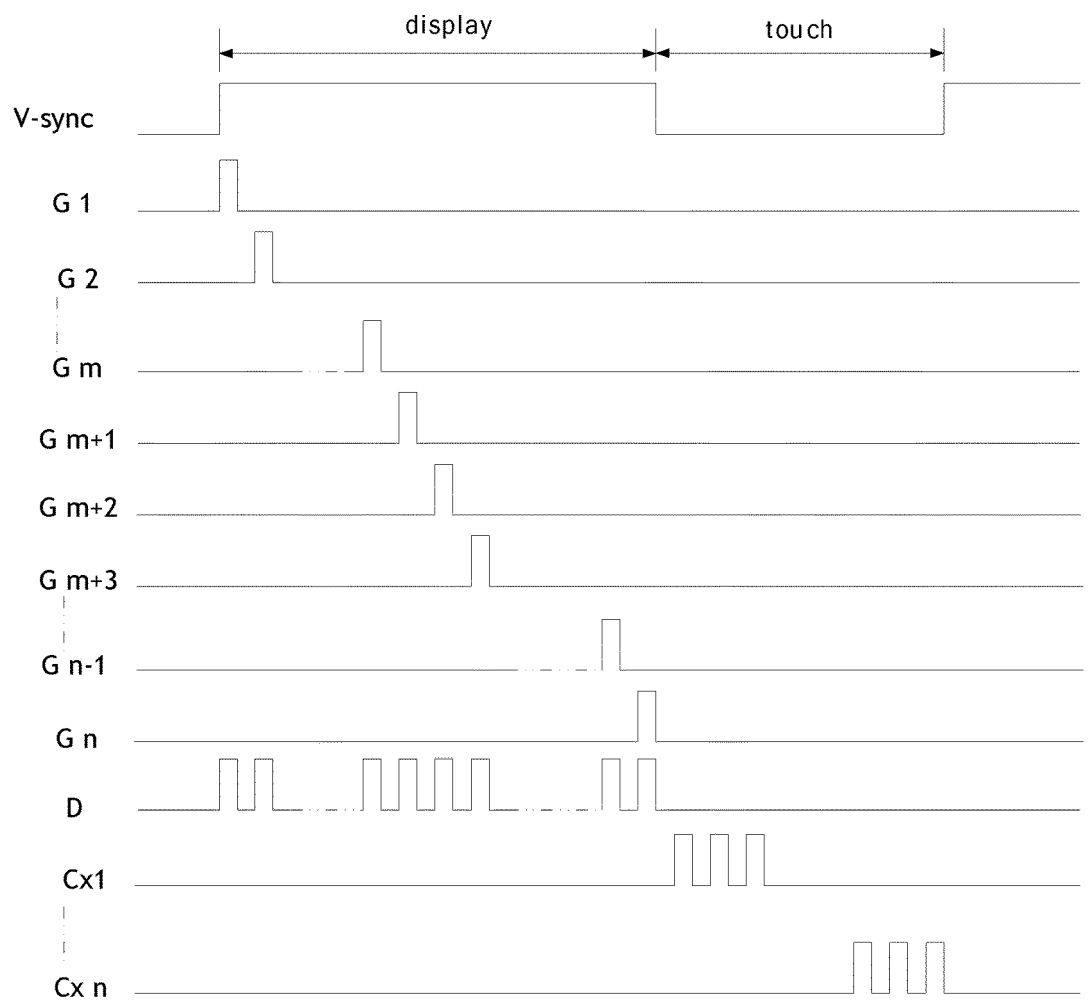
FIG. 4*a* to FIG. 4*d* are schematic driving time sequence diagrams of an in-cell touch panel provided by an embodiment of the present disclosure respectively.
Figure 4B:
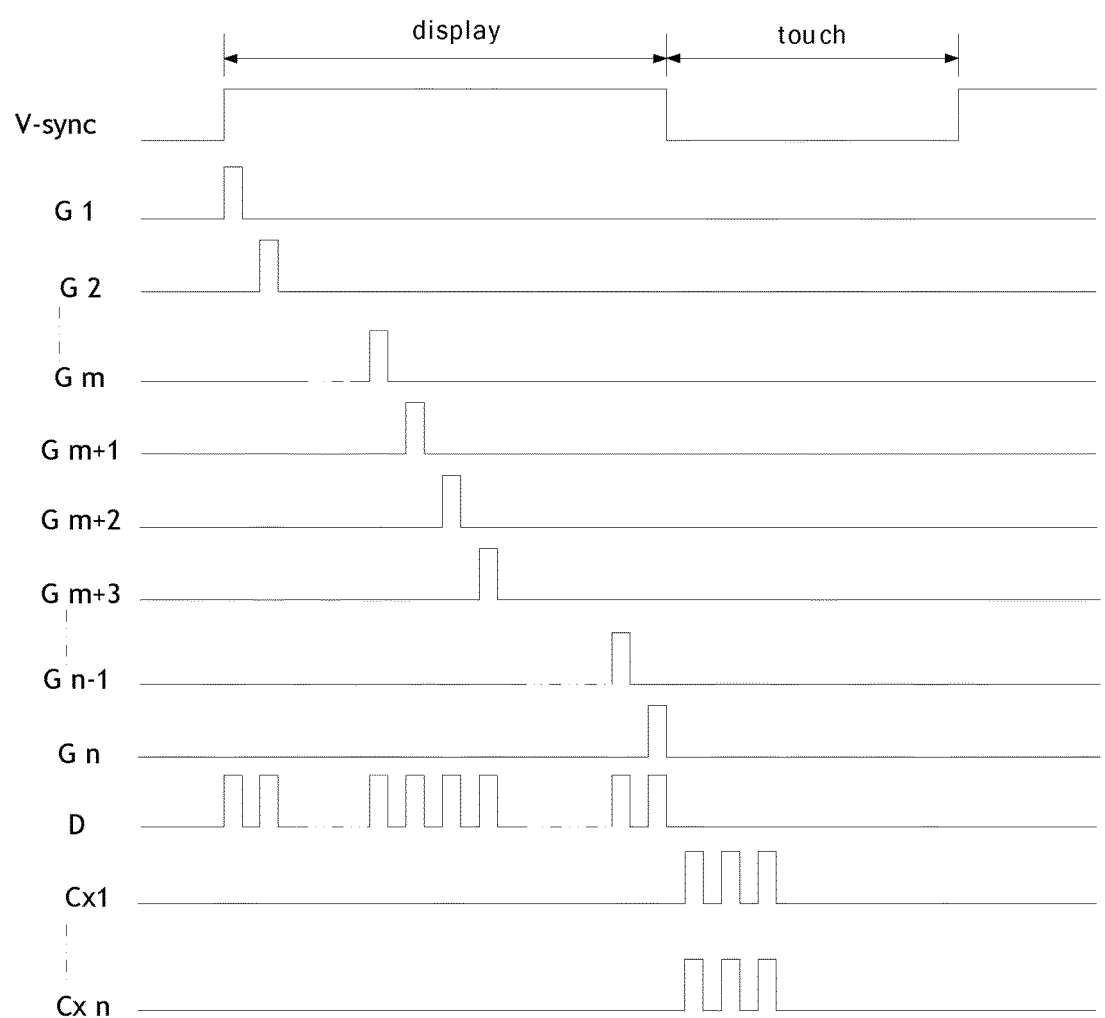

For example: in the driving time sequence diagrams illustrated in FIG. 4a and FIG. 4b, the time-period when the touch panel displays each frame (V-sync) is divided into a display time period (display) and a touch control time period (touch). For example, in the driving time sequence diagrams illustrated in FIG. 4a and FIG. 4b, the time-period when the touch panel displays one frame is 16.7 ms, 5 ms of which is selected as the touch control time period, and the remaining 11.7 ms serves as the display time period. Certainly, the lengths of the two time-periods can also be appropriately adjusted according to the processing capacity of an IC (Integrated Circuit) chip as well, and embodiments of the disclosure are not limited thereto. In a display time period (display), gate scanning signals are sequentially applied to respective gate signal lines G1, G2, . . . ,Gn in the touch panel, a gray-scale signal is applied to each data signal line, the touch detection chip connected to the self-capacitive electrodes Cx1, . . . , Cx . . . , n applies common electrode signals respectively to the self-capacitive electrodes Cx1, . . . , Cx n, so as to achieve a liquid crystal display function. In a touch control time period (touch), as illustrated in FIG. 4a, the touch detection chip connected to the self-capacitive electrodes Cx1, . . . , Cx n sequentially applies driving signals respectively to the self-capacitive electrodes Cx1, . . . , Cx n, and respectively receives feedback signals of the self-capacitive electrodes Cx1, . . . , Cx n; or as illustrated in FIG. 4b, the touch detection chip connected to the self-capacitive electrodes Cx1, . . . , Cx n can also simultaneously apply driving signals respectively to the self-capacitive electrodes Cx1, . . . , Cx n, and simultaneously receives feedback signals of the self-capacitive electrodes Cx1, . . . , Cx n, and limitations are not imposed in this way. By analyzing the feedback signals, whether or not a touch occurs is judged, to achieve a touch function.

Figure 5A:
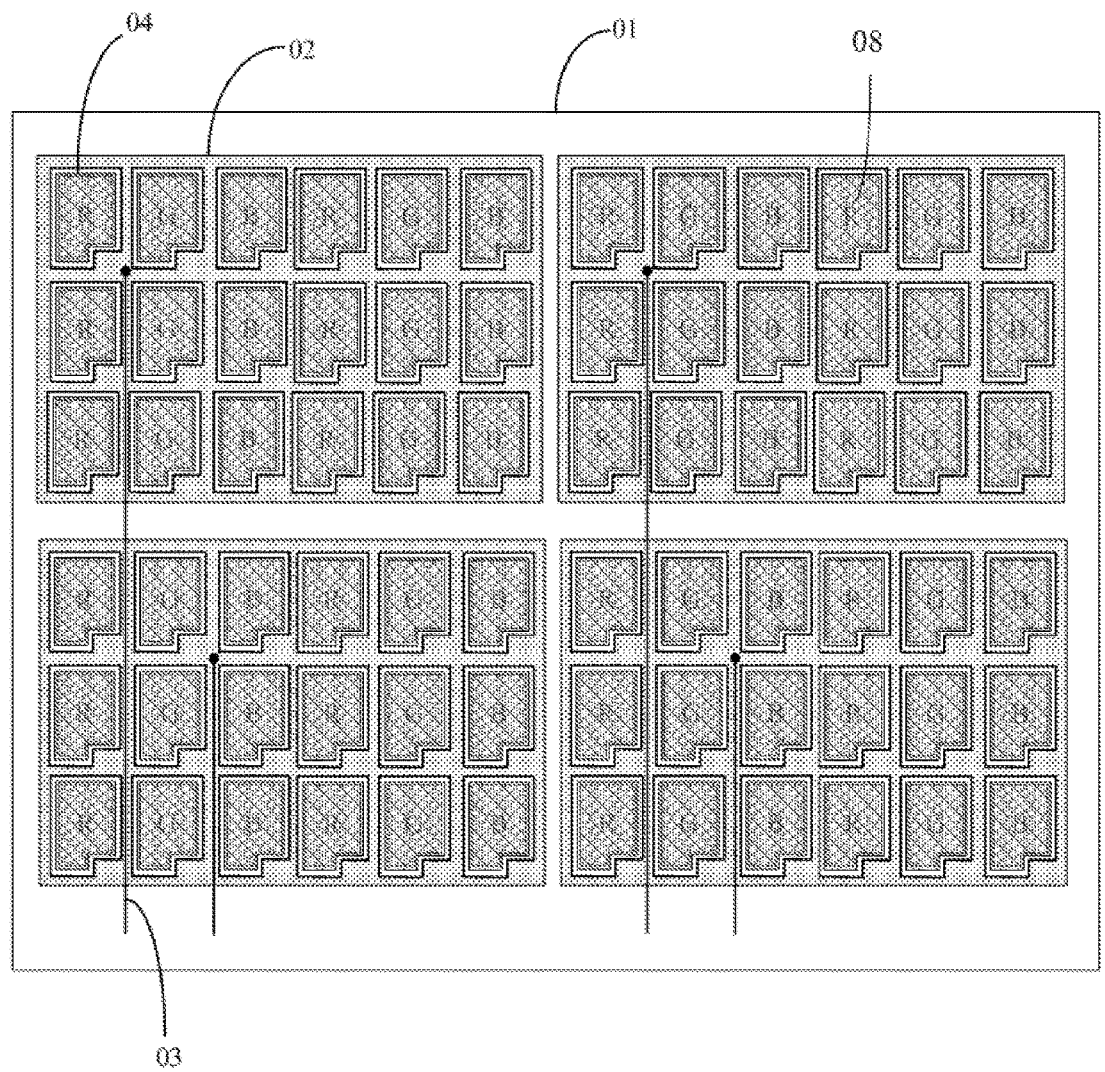
FIG. 5*a* is a fifth schematic structural view illustrating an in-cell touch panel provided by an embodiment of the present disclosure.
Figure 5B:
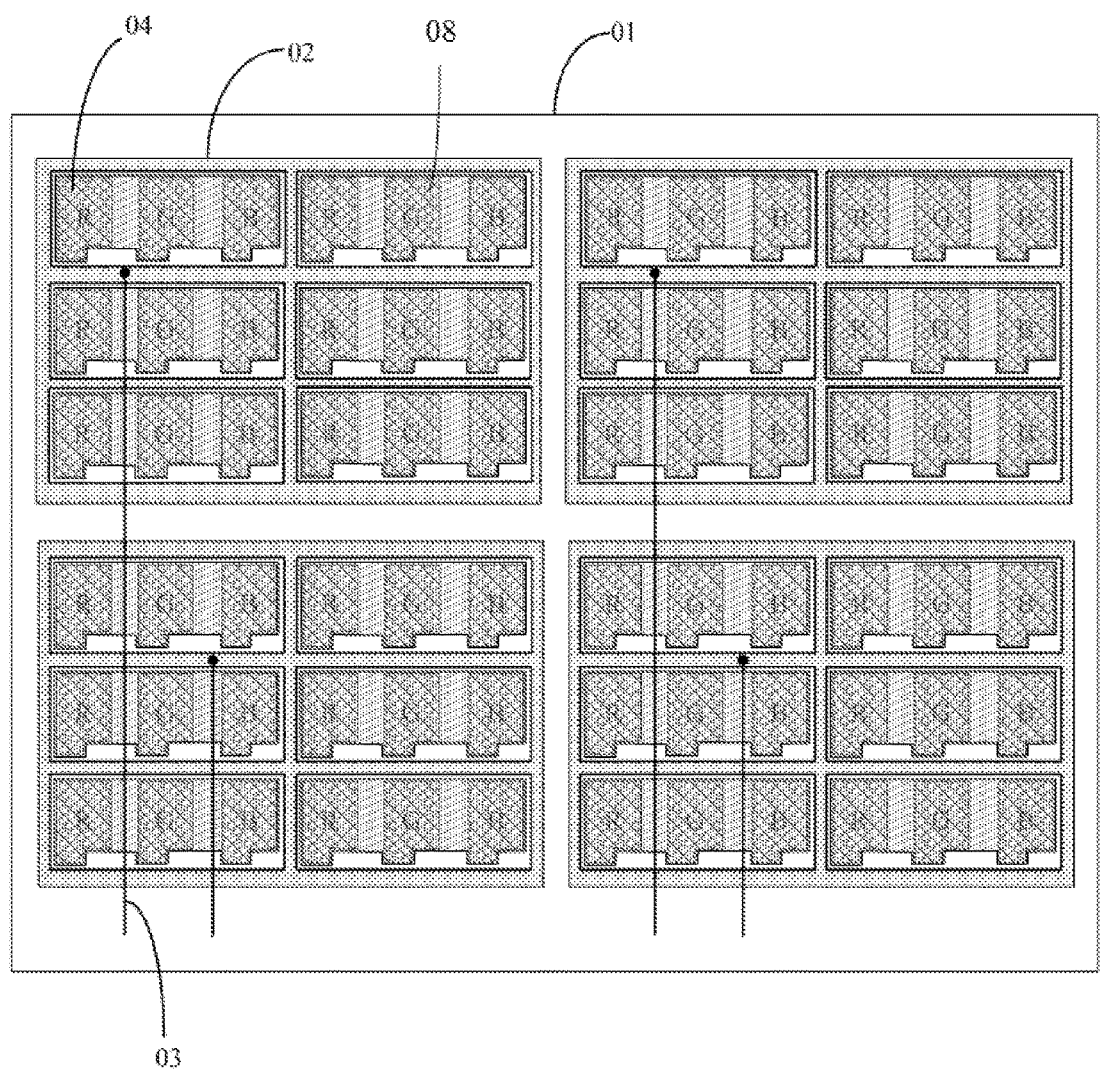
FIG. 5*b* is a sixth schematic structural view illustrating an in-cell touch panel provided by an embodiment of the present disclosure.

Certainly, in practice, the above-mentioned in-cell touch panel provided by an embodiment of the present disclosure can also adopt the driving mode that the driving in the touch period and the driving in the display period are performed simultaneously. For example, when the driving mode of the in-cell touch panel is a synchronization driving mode, as illustrated in FIG. 5a and FIG. 5b, each self-capacitive electrode 02 can correspond to a plurality of pixels 08 arranged at the lower substrate, and be provided with the common electrodes 04 at least at positions to which the opening regions of the pixels respectively correspond. And thus, in display, the liquid crystal in the opening region of each pixel can be normally rotated, to guarantee that the display screen can display normally.

Furthermore, in practice, for example, as illustrated in FIG. 5a, one common electrode 04 can be arranged at a position to which the opening region of each pixel corresponds, namely one opening region corresponds to one hollowed-out region. Certainly, for example, as illustrated in FIG. 5b, one hollowed-out region can also correspond to a plurality of pixels, so as to guarantee that the common electrode 04 arranged in the hollowed-out region covers the opening regions of the plurality of pixels.

Figure 4C:
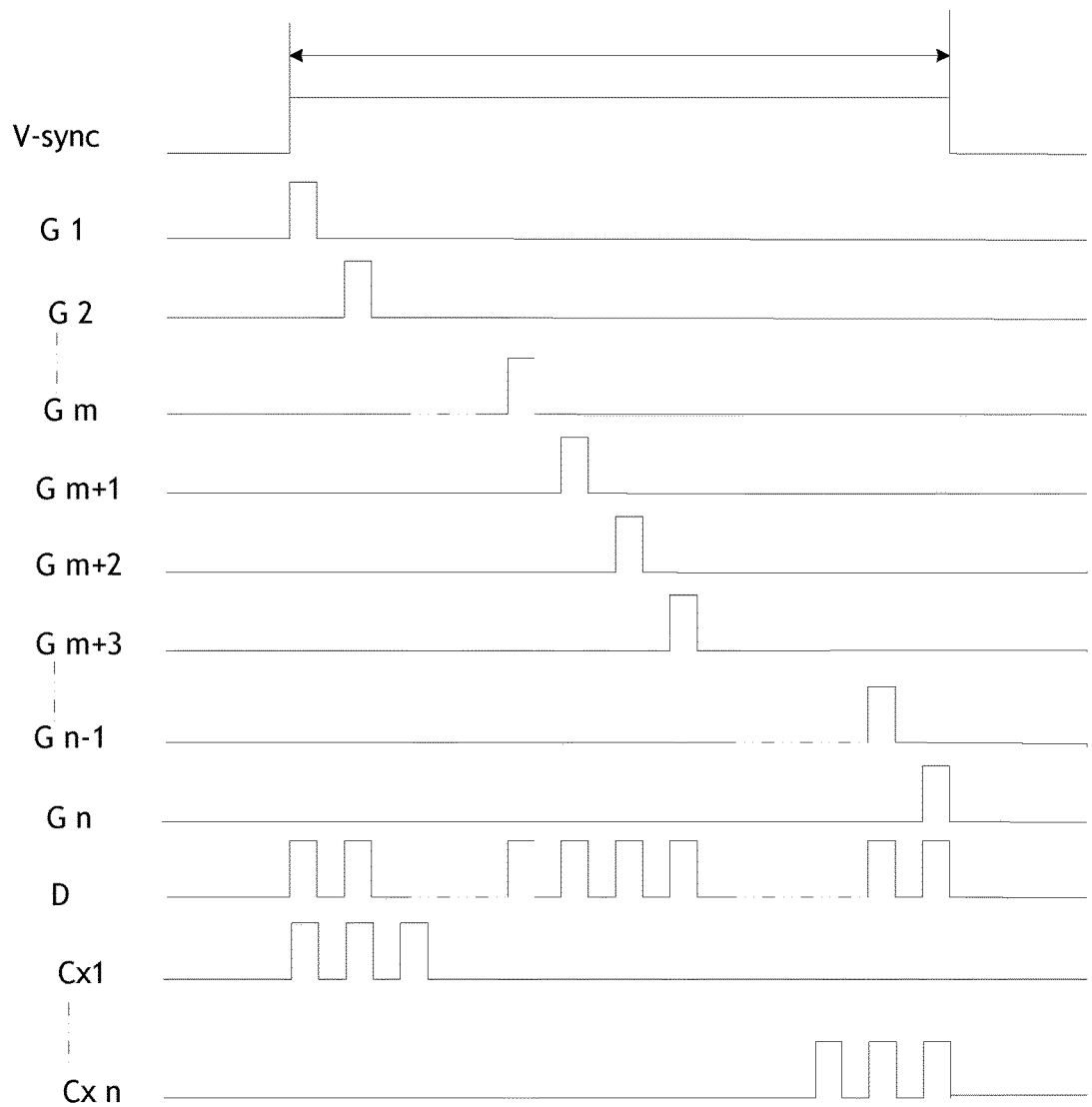
Figure 4D:
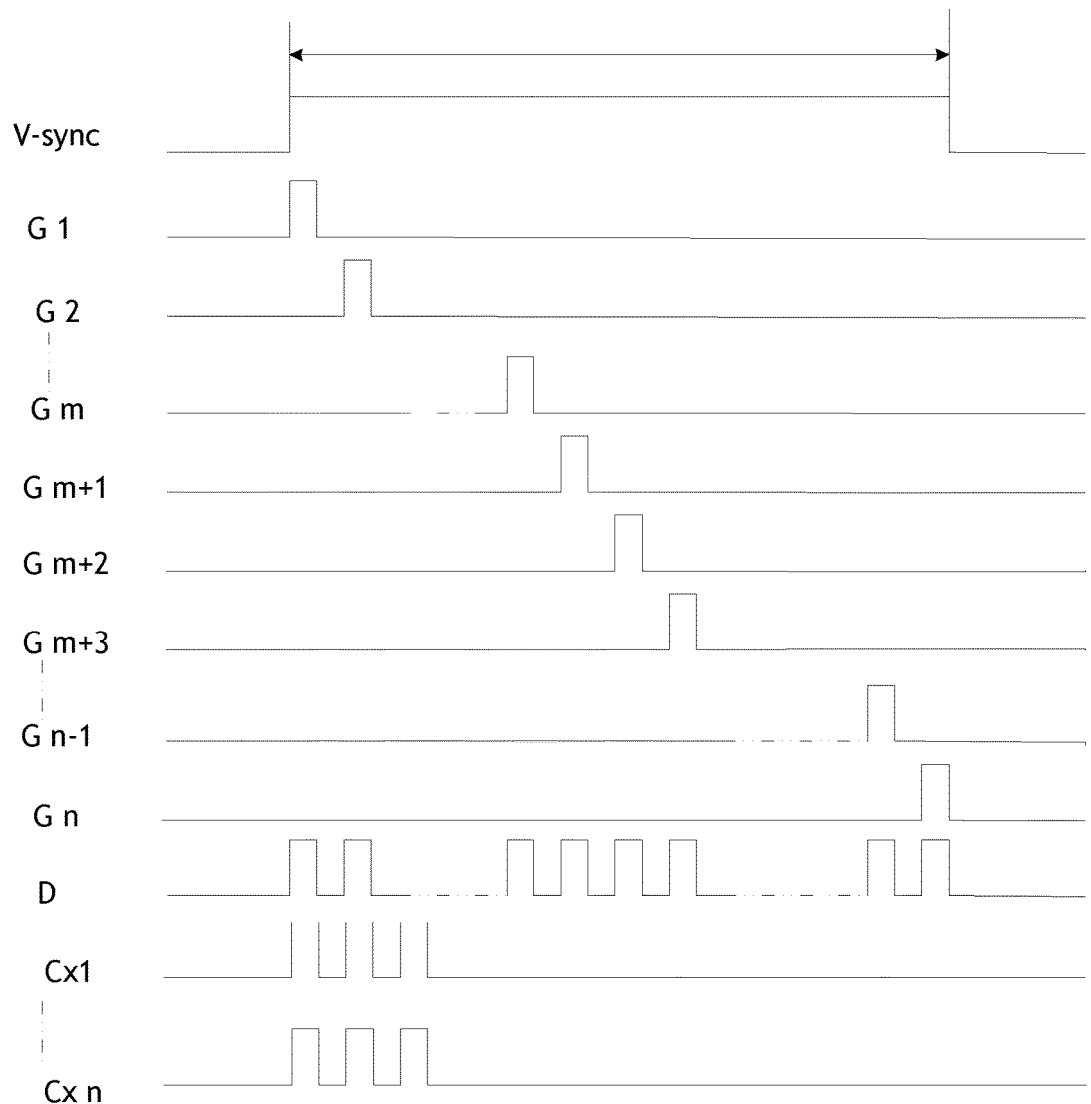

For example, when the above-mentioned in-cell touch panel provided by an embodiment of the present disclosure adopts the synchronization driving mode, the driving time sequence diagrams can be referred to FIG. 4c and FIG. 4d, within the time-period of one frame, gate scanning signals are sequentially applied to respective gate signal lines G1, G2, . . . , Gn in the touch panel, a gray-scale signal is applied to each data signal line, and the touch detection chip connected to the self-capacitive electrodes Cx1, . . . , Cx n applies common electrode signals respectively to the self-capacitive electrodes Cx1, . . . , Cx n, so as to achieve a liquid crystal display function. Meanwhile, within the time-period of one frame, as illustrated in FIG. 4c, the touch detection chip connected to the self-capacitive electrodes Cx1, . . . , Cx n sequentially applies driving signals respectively to the self-capacitive electrodes Cx1, . . . , Cx n, and sequentially receives feedback signals of the self-capacitive electrodes Cx1, . . . , Cx n; or as illustrated in FIG. 4d, the touch detection chip connected to the self-capacitive electrodes Cx1, . . . , Cx n can also simultaneously apply driving signals respectively to the self-capacitive electrodes Cx1, . . . , Cx n, and simultaneously receives feedback signals of the self-capacitive electrodes Cx1, . . . , Cx n, and limitations are not imposed in this way. By analyzing the feedback signals, whether or not a touch occurs is judged, to achieve a touch function.

Furthermore, in the above-mentioned in-cell touch panel provided by embodiments of the present disclosure, in each self-capacitive electrode, the shape of each hollowed-out region, in the plane where the self-capacitive electrode is located, can be regular or can also be irregular, and limitations are not imposed thereto. For example, in order to reduce the manufacturing complexity, the shape of the hollowed-out region, in the plane where the self-capacitive electrode is located, can be any regular shape, such as square, rectangle, triangle and circle; and for example, as illustrated in FIG. 3, the shape of the hollowed-out region can be square.

Accordingly, in the above-mentioned in-cell touch panel provided by embodiments of the present disclosure, the shape of the common electrode can be regular or irregular, and limitations are not imposed thereto. For example, in order to reduce the manufacturing complexity, the shape of the common electrode can be any regular shape, such as square, rectangle, triangle and circle; and for example, as illustrated in FIG. 3, the shape of the common electrode 04 can be square.

In at least one embodiment, in the above-mentioned in-cell touch panel provided by embodiments of the present disclosure, the shapes of the hollowed-out region and the self-capacitive electrode can be identical to or different from each other, and limitations are not imposed thereto. For example, in order to reduce the manufacturing complexity, as illustrated in FIG. 3, the shapes of the common electrode and the hollowed-out region are the same.

In practice, in order to make the sizes of the self-capacitive electrode, the hollowed-out region and the common electrode better meet the requirement of touch sensing accuracy, in the above-mentioned in-cell touch panel provided by an embodiment of the present disclosure, for example, the gap between each self-capacitive electrode and each of the common electrodes which are respectively arranged in the hollowed-out regions of the self-capacitive electrode can be controlled to be from 4 μm to 10 μm.

For example, the above-mentioned in-cell touch panel provided by an embodiment of the present disclosure can further include a common electrode wire, the common electrode wire can be arranged below the common electrodes, and the common electrode wire is electrically connected with each of the common electrodes through a via hole; and the conductive wires and the common electrode wire can be arranged in a same layer, and each conductive wire is connected with a corresponding self-capacitive electrode through a via hole. The conductive wires and the common electrode wires are disposed in the same layer, in this way, only one patterning process is needed to form the patterns of the conductive wires and the common electrode wires, and this can simplify the manufacturing steps and reduce manufacturing cost. Certainly, the conductive wires and the common electrode wires can also be disposed in different layers, and limitations are not imposed thereto.

In order to prevent the electric field generated by the self-capacitive electrodes from affecting the electric field of the opening regions of the pixels, for example, the above-mentioned in-cell touch panel provided by an embodiment of the present disclosure further includes a black matrix layer 09 which is arranged at the side, facing the lower substrate, of the upper substrate, or arranged at the side, facing the upper substrate, of the lower substrate, as illustrated in FIG. 2c; and an orthographic projection, on the lower substrate, of each self-capacitive electrode can be located within the orthographic projection, on the lower substrate, of the black matrix layer 09.

In the above-mentioned in-cell touch panel provided by embodiments of the present disclosure, because the material of the conductive wires is general a metallic material, in order not to affect the normal display, for example, the orthographic projection, on the lower substrate, of the pattern of each conductive wire is located within the region where the pattern of the black matrix layer is located.

In practice, in the in-cell touch panel provided by an embodiment of the present disclosure the above-mentioned, for example, the touch control detection chip can be arranged on a circuit board, for example, can be arranged on a circuit board that is arranged on the back side of a display screen, or can be arranged on a circuit board that is arranged in the frame region of the display screen, or can be arranged on a flexible circuit board that is included in the lower substrate.

For example, the conductive wires can be directly electrically connected with the touch control detection chip, or can be electrically connected with the touch control detection chip through corresponding peripheral leading wires. For example, in the case where the conductive wires are arranged at the side, facing the upper substrate, of the lower substrate and the touch control detection chip is arranged on the flexible circuit board that is included in the lower substrate, the conductive wires can be directly electrically connected with the touch control detection chip; and for example, in the case where the conductive wires are arranged at the side, facing the lower substrate, of the upper substrate, and the touch control detection chip is arranged on the circuit board on the back side of a display device, the conductive wires can be electrically connected with the touch control detection chip through peripheral leading wires.

Figure 6A:
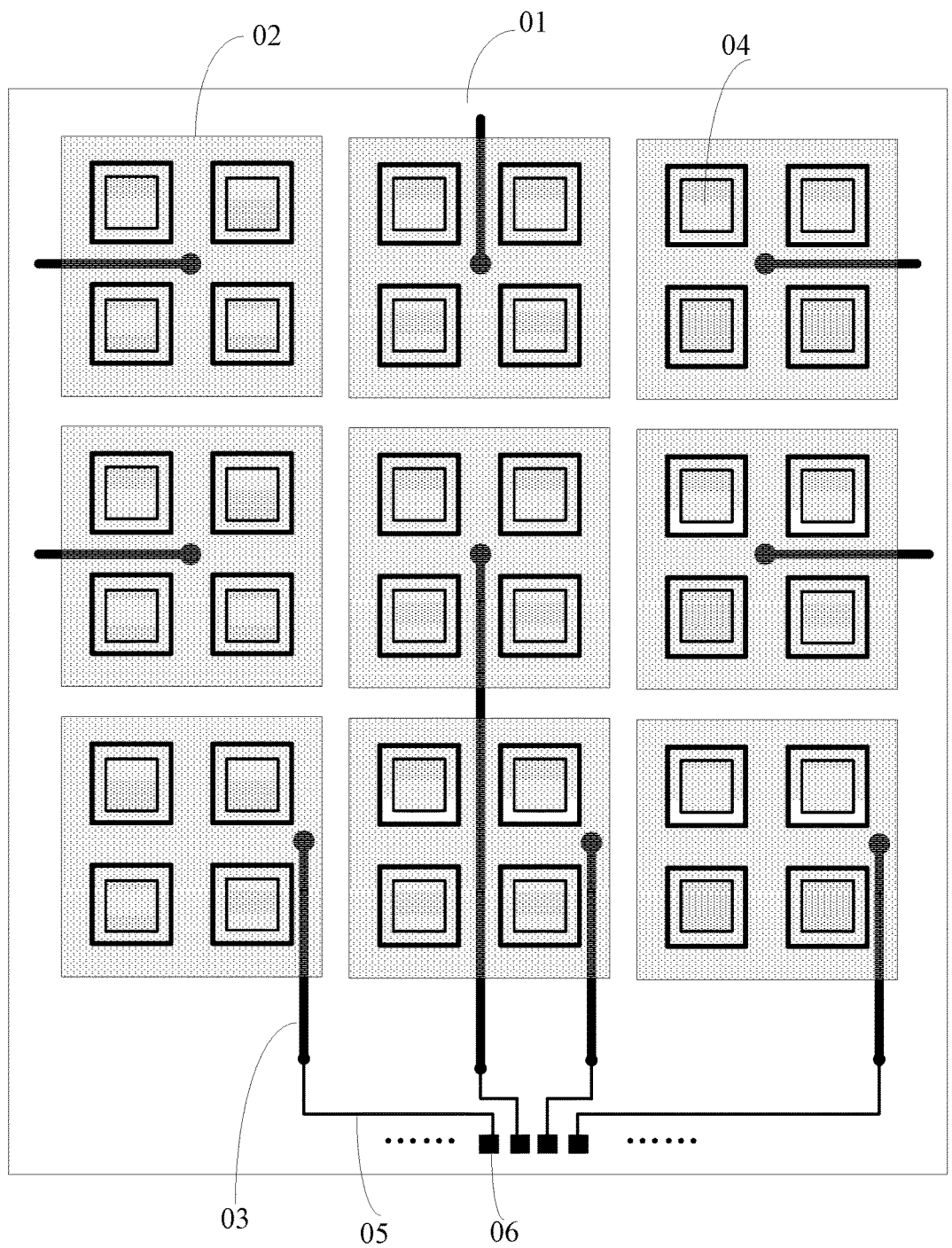
FIG. 6*a* is a seventh schematic structural view illustrating an in-cell touch panel provided by an embodiment of the present disclosure.
Figure 6B:
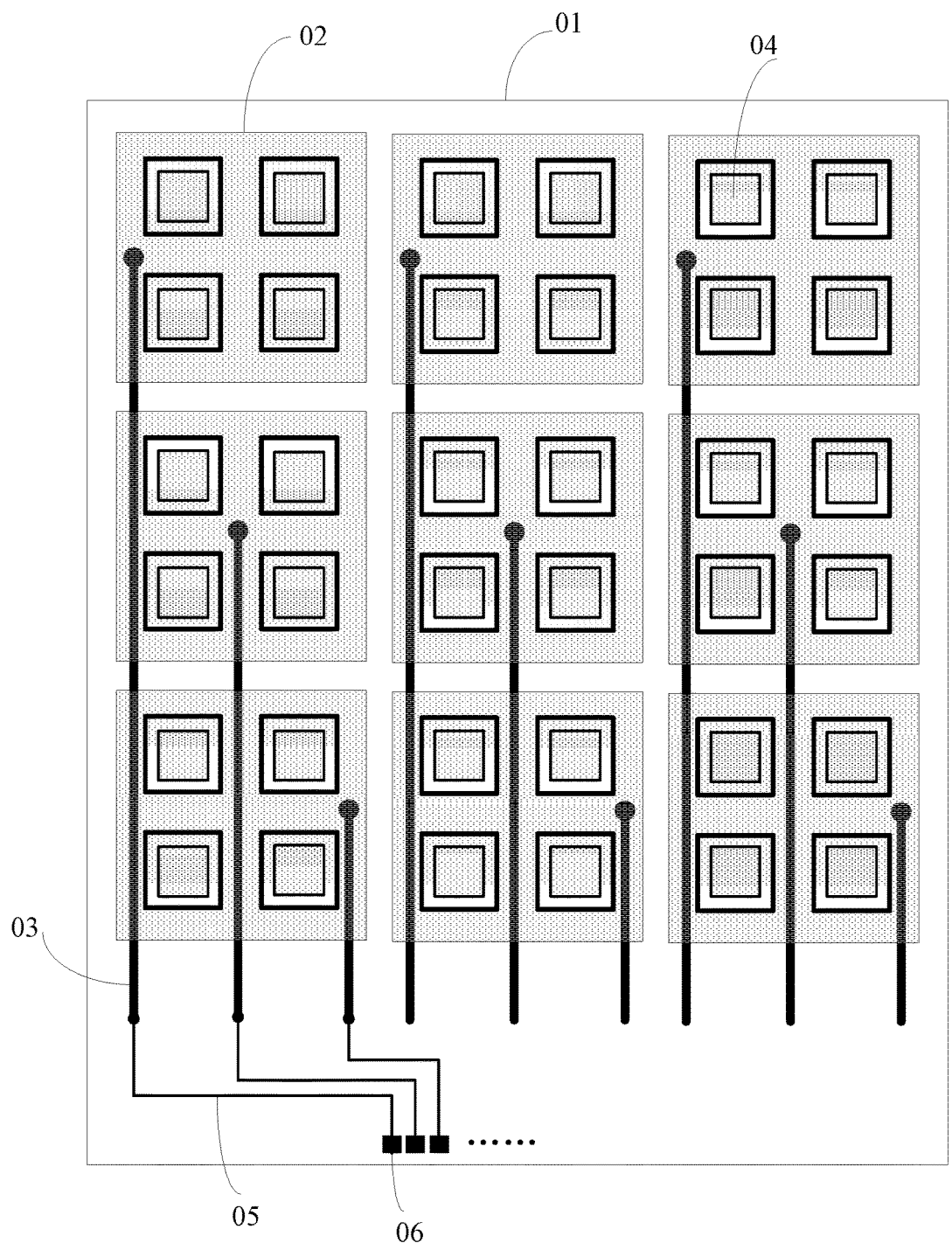
FIG. 6*b* is an eighth schematic structural view illustrating an in-cell touch panel provided by an embodiment of the present disclosure.

In practice, as illustrated in FIG. 6a and FIG. 6b, the conductive wires 03 respectively connect the self-capacitive electrodes 02 to the frame of the in-cell touch panel; for example, the in-cell touch panel can further include: peripheral leading wires 05 which are arranged at the frame of the in-cell touch panel and respectively electrically connected with the conductive wires 03; and the touch control detection chip is electrically connected with each peripheral leading wire 05 through a connection terminal 06.

In at least one embodiment, the frame of the in-cell touch panel can have four sides; on the basis that the conductive wires are not intersected with each other, each self-capacitive electrode can be connected to a side closest to the self-capacitive electrode through a corresponding conductive wire. For example, as illustrated in FIG. 6a, the frame of the in-cell touch panel has four sides, each self-capacitive electrode 02 is connected to a closest side through a corresponding conductive wire 03 on the basis that the conductive wires 03 are not intersected with each other.

Or, for example, as illustrated in FIG. 6b, the frame of the in-cell touch panel can have a square shape, and the extending direction of each conductive wire 03 can be the same as the short-side direction (the direction where the short side is located) of the frame, thus the intervals between the conductive wires are larger, so it is easy to guarantee that the conductive wires are not intersected with each other to make the conductive wires electrically insulated from each other. Certainly, in practice, the extending direction of each conductive wire can also be the same as the long-side direction of the frame, and limitations are not imposed thereto.

For example, in practice, the peripheral leading wires can be arranged on the lower substrate, or can also be arranged on the upper substrate, and limitations are not imposed thereto. Preferably, the peripheral leading wires are generally arranged on the lower substrate.

In practice, if the self-capacitive electrodes and the conductive wires are arranged on the upper substrate, the conductive wires can be respectively electrically connected with the peripheral leading wires on the lower substrate through, for example, the conduction effect of the metal balls of electrically connecting an upper portion and a lower portion in a frame sealant; and if the self-capacitive electrodes and the conductive wires are arranged on the lower substrate, the conductive wires can be directly electrically connected with the corresponding peripheral leading wires arranged on the lower substrate.

Figure 7:
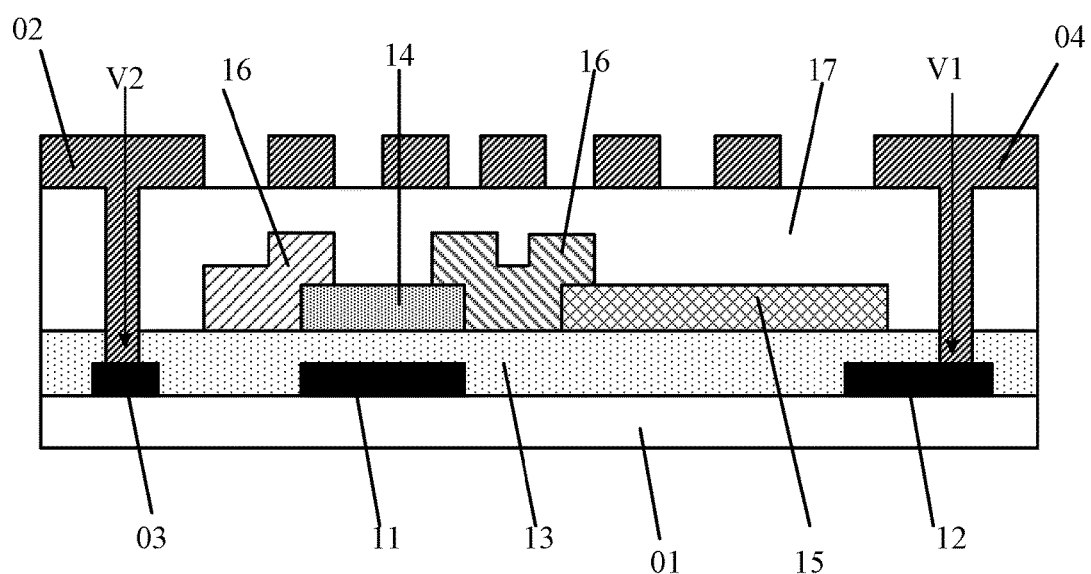
FIG. 7 is a ninth schematic structural view illustrating an in-cell touch panel provided by an embodiment of the present disclosure.

In the following, the above-mentioned in-cell touch panel is described in detail with respect to the example that the above-mentioned in-cell touch panel provided by an embodiment of the present disclosure is used in an HADS mode liquid crystal display. As illustrated in FIG. 7, the in-cell touch panel can include: an upper substrate (not shown in the drawing) and a lower substrate 01 which are opposite to each other, and the following structures which are sequentially arranged on the lower substrate 01: a gate electrode 11, a conductive wire 03 and a common electrode wire 12 which are arranged in a same layer; a gate insulating layer 13, an active layer 14 and a pixel electrode 15 which are disposed in a same layer and spaced from each other, source/drain electrodes 16, a passivation layer 17, and a self-capacitive electrode 02 and a common electrode 04 which are arranged in a same layer and insulated from each other. The common electrode 04 is electrically connected with the common electrode wire 12 through a first via hole V1 passing through the gate insulating layer 13 and the passivation layer 17, and the self-capacitive electrode 02 is electrically connected with the conductive wire 03 through a second via hole V2 passing through the gate insulating layer 13 and the passivation layer 17.

In practice, other required components of a liquid crystal display are further provided between the upper substrate and the lower substrate of the above-mentioned in-cell touch panel, and these components can adopt the common technologies in the art, and detailed descriptions are omitted herein.

In practice, the above-mentioned touch panel provided by embodiments of the present disclosure can adopt any one of patterning methods commonly-used in the art to manufacture the films on the lower substrate, and for example, the method of six (6) patterning processes can be used, namely: a patterning process of forming the gate electrode, the conductive wire and the common electrode wire; a patterning process of forming the active layer; a patterning process of forming the pixel electrode; a patterning process of forming the source/drain electrodes; a patterning process of forming the passivation layer; and a patterning process of forming the common electrode layer. Certainly, the method of five (5) patterning processes, the method of seven (7) patterning processes or the method of eight (8) patterning processes can also be used, and limitations are not imposed thereto.

Base on the same inventive concept, at least one embodiment of the present disclosure further provides a display device, which includes the above-mentioned in-cell touch panel provided by any one of embodiments of the present disclosure.

For example, the display device can be a cell phone, a tablet computer, a television, a display, a notebook computer, a digital photo frame, a navigator or any other product or component having a display function.

Implementation of the display device can be referred to the embodiments of the above in-cell touch panel, and repetitions are omitted herein.

In the above-mentioned in-cell touch panel and display device provided by embodiments of the present disclosure, due to that each self-capacitive electrode is provided with the plurality of the hollowed-out regions, the area of each self-capacitive electrode can be reduced, and thus the inherent capacitance of each self-capacitive electrode can be reduced; on the assumption that the capacitance of a finger does not change in touch, the capacitance applied to the self-capacitive electrode, namely the fixed value plus the capacitance of the finger, is relatively smaller, and thus the RC delay of a feedback signal of the self-capacitive electrode can be reduced; and, the capacitance variation between capacitances of the self-capacitive electrode before and after the touch is relatively increased with respect to the inherent capacitance, thus the variation of the feedback signal caused by the finger is correspondingly increased, and thus the touch control sensitivity is improved. Besides, the area of each self-capacitive electrode is reduced by providing hollowed-out regions within the self-capacitive electrode, and therefore, not only the touch blind region between adjacent self-capacitive electrodes is not increased, but also the quantity of the self-capacitive electrodes is not increased, and thus, compared with the situation illustrated in FIG. 1, the touch control sensitivity of the touch panel can be improved while guaranteeing a narrow frame design.

What are described above is related to the illustrative embodiments of the disclosure only and not limitative to the scope of the disclosure; the scopes of the disclosure are defined by the accompanying claims.

This application claims the benefit of Chinese Patent Application No. 201510024268.3, filed on Jan. 16, 2015, which is hereby entirely incorporated by reference as a part of the present application.

The invention claimed is:
1. An in-cell touch panel, comprising:
   an upper substrate and a lower substrate which are opposite to each other;
   a plurality of separate self-capacitive electrodes, arranged in an array and in a same layer;

a plurality of conductive wires connected with the self-capacitive electrodes, wherein the in-cell touch panel is configured for detecting a touch through detecting capacitance change of each of the self-capacitive electrodes; and a touch control detection chip, configured to determine a touch position in a touch control time period by detecting a capacitance variation of each of the self-capacitive electrodes, wherein the plurality of the conductive wires connect the plurality of separate self-capacitive electrodes to the touch control detection chip, wherein:

each of the self-capacitive electrodes is provided with a plurality of hollowed-out regions disposed in rows and columns;

the in-cell touch panel further comprises a plurality of display pixels, each of which is provided with an opening region;

the hollowed-out regions of each self-capacitive electrode each correspond to the opening region of at least one display pixel, and an orthographic projection of the opening region of the at least one display pixel on the each self-capacitive electrode falls within the corresponding hollowed-out region;

the in-cell touch panel further comprises common electrodes which are disposed in a same layer as the self-capacitive electrodes, respectively arranged within the hollowed-out regions of the self-capacitive electrodes, and insulated from the self-capacitive electrodes;

the touch control detection chip is further configured to apply a common electrode signal to the common electrodes in a display time period;

the in-cell touch panel has a driving mode in which a first driving for touch function and a second driving for display function are performed simultaneously; and each of the self-capacitive electrodes corresponds to a plurality of pixels disposed on the lower substrate, and the common electrodes are respectively arranged at least at positions, to which opening regions of the pixels respectively correspond.

2. The in-cell touch panel according to claim 1, wherein shapes of the common electrodes are identical to those of the hollowed-out regions.

3. The in-cell touch panel according to claim 1, wherein a gap between each of the self-capacitive electrodes and each of the common electrodes which are respectively arranged within the hollowed-out regions of the self-capacitive electrodes is from 4 μm to 10 μm.

4. The in-cell touch panel according to claim 1, further comprising: a common electrode wire which is electrically connected with each of the common electrodes through a via hole.

5. The in-cell touch panel according to claim 4, wherein the conductive wires and the common electrode wire are disposed in a same layer, and each of the conductive wires is electrically connected with a corresponding self-capacitive electrode through a via hole.

6. The in-cell touch panel according to claim 1, wherein the hollowed-out regions each have a maximum inside diameter of 1 mm.

7. The in-cell touch panel according to claim 1, further comprising: a black matrix layer arranged at a side, facing the lower substrate, of the upper substrate, or at a side, facing the upper substrate, of the lower substrate, wherein an orthographic projection, on the lower substrate, of each self-capacitive electrode is located within an orthographic projection, on the lower substrate, of the black matrix layer.

8. The in-cell touch panel according to claim 1, wherein the conductive wires respectively connect the self-capacitive electrodes to a frame of the in-cell touch panel;

the in-cell touch panel further comprises peripheral leading wires arranged at the frame of the in-cell touch panel and respectively electrically connected with the conductive wires; and the touch control detection chip is electrically connected with each of the peripheral leading wires through a connection terminal.

9. The in-cell touch panel according to claim 1, wherein a frame of the in-cell touch panel has four sides, each of the self-capacitive electrodes is connected to a side closest to this self-capacitive electrode through a corresponding conductive wire on the basis that the conductive wires are not intersected with each other; or a shape of the frame of the in-cell touch panel is rectangular, and each of the conductive wires has an extending direction identical to a short-side direction or a long-side direction of the frame.

10. A display device, comprising the in-cell touch panel according to claim 1.

11. The in-cell touch panel according to claim 1, wherein a shape of each of the common electrodes comprises a slit.

12. The in-cell touch panel according to claim 11, further comprising a plurality of pixel electrodes which are corresponding to the common electrodes in a one-to-one correspondence, wherein the pixel electrodes are between a layer where the common electrodes are located and a layer where the conductive wires are located.

* * * * *